Figure 1:
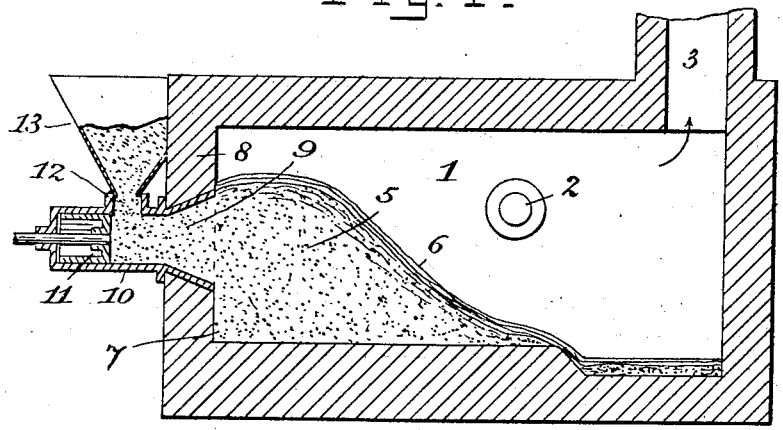

No. 729,614. PATENTED JUNE 2, 1903.
C. G. P. DE LAVAL.
PROCESS OF TREATING MATERIALS BY RADIATED HEAT
IN ELECTRIC FURNACES.
APPLICATION FILED MAR. 19, 1902.
NO MODEL.

Witnesses:
E. B. Bolton
Isabella Waldron

Inventor:
Carl Gustaf Patrik de Laval
By Richards
his Attorneys.

No. 729,614. Patented June 2, 1903.

UNITED STATES PATENT OFFICE.

CARL GUSTAF PATRIK DE LAVAL, OF STOCKHOLM, SWEDEN.

PROCESS OF TREATING MATERIALS BY RADIATED HEAT IN ELECTRIC FURNACES.

SPECIFICATION forming part of Letters Patent No. 729,614, dated June 2, 1903.

Application filed March 19, 1902. Serial No. 98,957. (No specimens.)

*To all whom it may concern:*

Be it known that I, CARL GUSTAF PATRIK DE LAVAL, a subject of the King of Sweden and Norway, and a resident of Stockholm, Sweden, have invented certain new and useful Improvements in the Process of Treating Materials by Radiated Heat in Electric Furnaces.

Radiated heat generated from an electric arc, from electrically-heated conductors, or by means of electric induction and reflected from the walls of the furnace may be employed, as is well known, for treating materials of different kind—as, for instance, for producing calcium carbid, for extracting metals from their ores, &c. If, however, the material, which is charged in a finely-crushed condition, be placed near to the source of heat, the development of gases generated by the chemical processes is very violent, causing the material to be thrown about in all directions in the furnace, resulting in great inconveniences. If, for instance, the treatment has for its object the distillation of volatile metals—as zinc, lead, &c.—part of the material will follow the metal vapors, which are thus rendered impure or imperfect. If the treatment has for its object the extraction of involatile metals, such as iron, the slag will be damaged by the material thus thrown about, which also will follow the escaping gases occurring from the process, thereby occasioning a loss. In order to conduct the process continuously and undisturbed, it has proved necessary to place the material in the electric furnace in such a way that the chemical processes (the development of gases and vapors) are carried out at a certain distance from the source of heat and with moderate violence, while the melting of the mineral and of the ingredients forming the slag takes place nearer to the source of heat. In my present invention this is accomplished by placing the material in the electric furnace so as to constitute a pile or stack with a sloping side, which is maintained at a practically constant distance from the source of heat by continuously introducing material at the back of the stack, so as to continuously push the stack forward corresponding to the melting action of the source of heat upon the surface of the slope. The chemical processes are effected at the surface of the slope, from which gases and vapors escape, while the involatile ingredients of the charge (the mineral, involatile metals, &c.) slide down the slope to its base, where they melt and are exposed to the intense heat of the electric source of heat without being disturbed by any development of gases, which, as above stated, takes place at the surface of the slope. When the processes have continued some time, a layer of molten or half-molten material is formed, having a slow motion down the slope and covering the pulverulent material. It is important for the undisturbed proceeding of the treatment that the introduction of fresh material at the back of the stack be performed uniformly and with proper speed.

The mechanical arrangements for carrying out the continuous introduction at the back of the stack may consist in reciprocating pistons, rotating transport-screws, or the like; but it must be understood that the invention is not limited by any certain arrangement for this purpose.

In the accompanying drawings, which are intended to assist in making the invention entirely clear, there are shown pistons for introducing the material in an electric-arc furnace.

Figure 2:
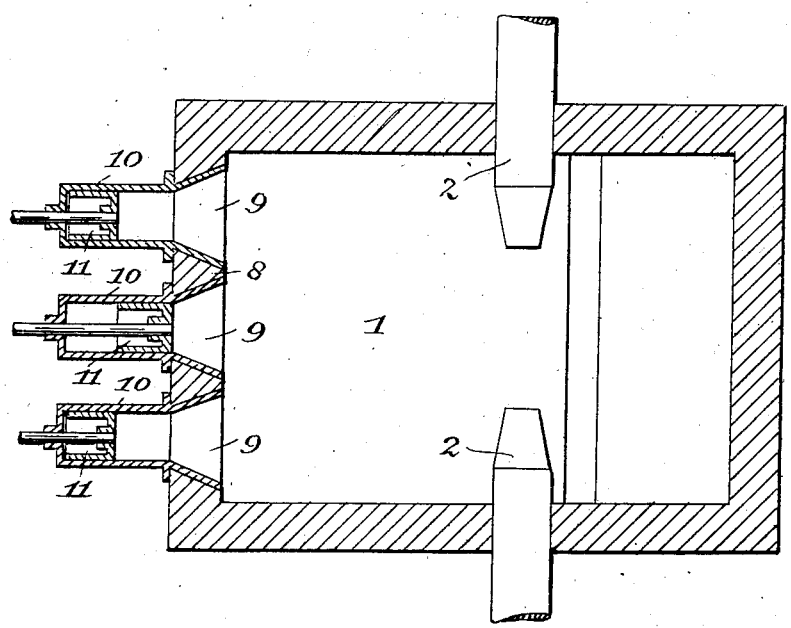

In the drawings, Figure 1 is a vertical longitudinal section through the furnace, and Fig. 2 is a horizontal section of the same.

1 indicates the furnace-chamber; 2, the electrodes, between which an arc is to be formed, the radiated heat of which is employed for treating the material in the furnace.

3 indicates an outlet for the gases and metal vapors developed during the processes.

The material to be treated is preferably charged into the furnace in finely-crushed condition in such a way that a stack or pile 5, with a sloping side 6 facing the arc, is formed. The length of the furnace from the arc to the back 7 of the pile or stack and also the thickness of the stack 5 are chosen by experiments in such a way that the slope 6 will be at such a distance from the electric arc that during the processes the development of gases will not be so violent that the powder is thrown about, but that a layer of half-molten material is formed on the surface of the slope, sliding slowly down the same, while the volatile ingredients of the material escape through the outlet 3. A suitable number of openings 9 (in the drawings three) are provided in the furnace-wall 8, through which the charge is continuously introduced, and the stack is thus pushed forward proportionately to the melting taking place on the surface of the slope 6. The openings 9 form outlets to cylinders 10, in which pistons 11 are movable to and fro by means of any well-known device, which is not shown in the drawings, as it does not form a part of this invention. The cylinders 10 are provided with openings 12, into which hoppers 13 open. When the pistons have performed their backward stroke, the charge is introduced to the cylinders through the hoppers 13 and is pressed forward by the pistons through the openings 9 into the furnace-chamber 1 at the back of the stack 5, whereby the stack is pushed forward correspondingly to maintain the sloping side 6 of the pile at a constant distance from the arc. In order to obtain a uniform introduction of material, the movement of the pistons may be effected in such a manner that the two outer pistons move inwardly when the middle piston moves outwardly. By means of slowly-rotating screw conveyers instead of the pistons the introduction of material will be perfectly uniform.

Having now described my invention, what I claim, and desire to secure by Letters Patent, is—

1. The process of treating material in an electric-furnace chamber which consists in introducing said material to form a stack having its sloping side facing the source of heat and controlling the temperature at said side and consequent rate of consumption of material thereat by mechanically decreasing the distance between said side and the source of heat.

2. The process of treating material in an electric-furnace chamber which consists in introducing said material to form a stack having its sloping side facing the source of heat and continuously and mechanically decreasing the distance between said side and the source of heat correspondingly to a predetermined rate of consumption of material at said side.

3. The process of treating material in an electric-furnace chamber which consists in introducing said material to form a stack having its sloping side facing the source of heat, and controlling the temperature at said side and consequent rate of consumption of material thereat by continuously and mechanically feeding fresh material to the back of said stack.

4. The process of treating material in an electric-furnace chamber which consists in introducing said material to form a stack first increasing and then decreasing in height in the direction of flow and controlling the temperature and the consequent rate of consumption at the sloping side of said stack facing the source of heat by continuously and mechanically feeding fresh material to the back of said stack.

In witness whereof I have hereunto set my hand in presence of two witnesses.

CARL GUSTAF PATRIK DE LAVAL.

Witnesses:
WARD BERNARD BOMAN,
H. RIDDERSTOLPE.